United States Patent [19]
Jean Ducros
[11] 3,889,043
[45] June 10, 1975

[54] EARTHING JOINT FOR SHIELDING CHAMBERS ELECTRICALLY AND ELECTROMAGNETICALLY

[76] Inventor: Emile Paul Jules Jean Ducros, 37, avenue of Saint Mande, Paris, France

[22] Filed: June 7, 1973

[21] Appl. No.: 367,833

[30] Foreign Application Priority Data
June 9, 1973 France........................ 72.20885

[52] U.S. Cl... 174/35 GC; 174/36.68 C; 277/235 R
[51] Int. Cl. ............................................ H05k 9/00
[58] Field of Search......... 174/35 GC, 35 MS, 68 C, 174/36; 277/234, 235 R

[56] References Cited
UNITED STATES PATENTS
3,260,788 7/1966 Stetson.......................... 174/35 GC

*Primary Examiner*—Darrell L. Clay
*Attorney, Agent, or Firm*—Kinzer, Plyer, Dorn & McEachran

[57] ABSTRACT
The invention relates to an earthing joint for shielding chambers electrically and electro-magnetically, which consists of a flexible, electricity conducting strip in which is included a magnetic means consisting, for example, of a permanent magnet.

4 Claims, 7 Drawing Figures

EARTHING JOINT FOR SHIELDING CHAMBERS ELECTRICALLY AND ELECTROMAGNETICALLY

The invention relates to an earthing joint for shielding chambers electrically and electro-magnetically.

The invention is characterized in that the earthing joint for shielding chambers electrically or electromagnetically comprises a flexible electricity conducting strip and includes a magnetic means.

According to a characteristic of the invention, the magnetic means consists of at least one permanent magnet.

According to another characteristic of the invention, the magnetic means is located inside the flexible material, which itself is covered by the conducting strip.

According to another characteristic of the invention, the magnetic means is incorporated in the mass of the conducting strip itself.

According to another characteristic of the invention, the flexible magnetic means is covered with a flexible electrically conductive film, such as a varnish or rubber-paint.

The invention is illustrated by way of non-limitative examples in the attached drawings in which.

The earthing joints according to the invention are principally, but not exclusively, intended to be fitted onto the surround of a door of a metal cabinet containing, either electrical apparatus which requires to be protected from unwanted exterior frequencies which could affect their operation, or radiation generators producing radiations which must not be allowed to escape to the exterior because of the harm they might cause.

To ensure that a satisfactory electrical contact is made between the earthing joint and the surfaces of the chamber, the space between which is to be shielded, sufficient pressure must be exerted so that the joint is applied all over the surfaces to obtain a continuous or almost continuous contact and thus compensate for any irregularities that are present.

When the chambers are not made accurately, the irregularities to be compensated for can be substantial for which reason, on one hand, the joint must be of sufficient thickness to absorb these irregularities without suffering any permanent deformation and, on the other, to compress it sufficiently to make it conform to the shape of the irregularities by exerting a pressure sufficient to ensure that a good contact is made, even at the points where the compressive effect is not so strong. This leads to the construction of chambers, and particularly electrical cabinets, provided with means for closing the door which are capable of exerting considerable pressures, for example, screw mechanical stress multipliers. The construction of such cabinets is therefore costly.

Moreover, when a chamber has been made accurately, joints can be used which are less thick and the pressure used can be smaller than before, while however still being considerable, but making these cabinets accurately also is costly.

Bearing these remarks in mind, the object of the present invention is thus to provide an earthing joint for shielding electrical chambers of low cost, that is to say, a joint which can provide good electrical contact between the two surfaces that are to be joined whatever the irregularities on the surfaces might be, without requiring considerable tightening pressures to be exerted onto these two surfaces. With this new type of joint, the pressure required for good electrical contact at every point is obtained by magnetic attraction; it is possible therefore to obtain a satisfactory electro-magnetic closure of chambers of light and imprecise construction without having recourse to powerful and expensive mechanical closure means.

Figure 1:
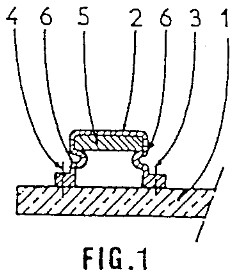
FIG. 1 is a cross-sectional view of a first mode of embodiment of the joint mounted on its support.

Thus in FIG. 1, attached, there is represented a first mode of embodiment of the joint which if fixed on the surround of a door of a metal cabinet 1.

This joint consists, according to the invention, of a flexible conducting strip, inside which there is a magnetic means intended to apply the conducting strip on the whole of the periphery of the opposite conducting surface.

This magnetic means can be made in different ways with the aid of coils, a succession of small permanent magnets or a permanently magnetised flexible strip.

Likewise, the flexible conducting strip can be made in different ways and in the example of embodiment in FIG. 1, this strip consists of a solid or cellular, flexible material, which is insulating in itself, such as rubber or a plastic material, inside which are incorporated conducting particles, such as flakes, powder, fiber, wire, etc... which can connect electrically the door 1 of a chamber and the periphery of the opening of the cabinet which is located opposite.

In this case, the flexible conducting strip 2 is fixed at 3 and at 4 by some means, such as screws, to the door 1 of the cabinet, and comprises internally a permanent magnet 5 made in the form of a strip.

In the example shown, the flexible strip 2 also comprises some bellows 6 on its lateral edges which are intended to give the joint good elasticity and enable it to conform to the shape of the irregularities of the surface and ensure that a good electrical contact is made.

Figure 2:
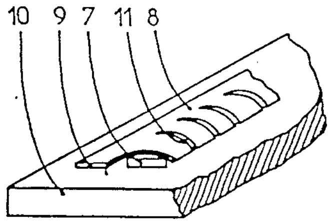
FIGS. 2 and 3 represent other modes of embodiment of this joint.

In the example of embodiment shown in FIG. 2, the shielding joint also consists of a permanent magnet 7, made in the form of a flexible strip, which is located inside a strip consisting, in this case, of a thin and flexible narrow strip 8 made of a material which allows a magnetic flux to pass through. The covering is fixed by one of its longitudinal edges 9, by glueing or the like, to the surround of the door 10 of a cabinet, while its other longitudinal edge comprises slits 11 which are transversal to the length of this narrow strip and are intended to give good elasticity to the joint constituted by the magnet and the narrow strip 8.

Likewise, in this case, the magnet or magnets 7 apply the metal envelope, constiuted by the narrow strip 8, to all the points on the surface opposite, so as to make a continuous or almost continuous contact which is required for electrical shielding.

Figure 3:
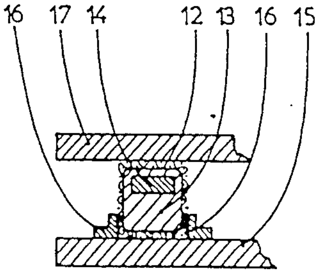

In the example of embodiment shown in FIG. 3, the joint comprises an elastic and electrically conducting envelope constituted by a metal framework 12, preferably made by knitting, this envelope surrounding a flexible profiled section 13 consisting, for example, of a cellular material which itself contains a permanent magnet 14 made in the form of a strip.

This joint is fixed to one of the metal elements that are to be connected electrically, for example, to the door 15 of a chamber by means of angle pieces 16 fixed in position by screwing or glueing.

In this case also, the permanent magnet 14, by its magnetic action, maintains the metal sheath 12 against the opposite metal surface 17 in order to make electrical contact.

Figure 4:
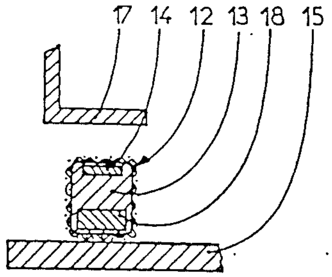
FIG. 4 illustrates another mode of embodiment of this joint and its mount on a support.

The example of embodiment in FIG. 4 shows a joint made in a manner similar to that shown in FIG. 3 and which comprises, to this end, an external metal envelope 12 consisting of a mesh, a flexible profiled section 13 and a magnet 14 applying the joint against the opposite metal surface 17.

However, in the example of embodiment in FIG. 4, this joint is fixed to the door 15 of the cabinet by another permanent magnet 18 which is embodied inside a flexible profiled section 13 and of which the magnetic force is stronger than that of the permanent magnet 14. On account of this, when the door 15 is opened, the joint remains fixed to the door 15, because of the magnet 18, while it separates from the surface 17 because of the lesser force of attraction engendered by the permanent magnet 14.

Figure 5:
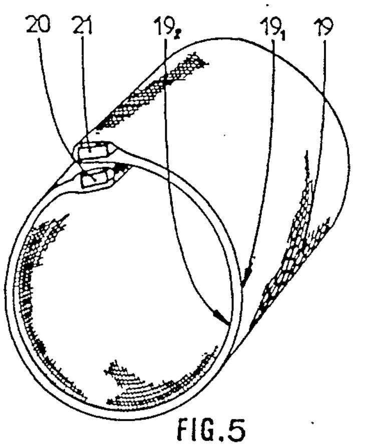
FIG. 5 shows a joint according to the invention, made in the form of a sheath.

In the example of embodiment in the FIG. 5, the sealing joint is made in the form of a sheath and, for example, is intended to surround a sheaf of cables for shielding them electrically. This sheath consists of a metal mesh 19, for example, of two thicknesses $19_1$ and $19_2$ and between which are located two permanent magnets 20 and 21, made in the form of flexible or semiflexible strips.

These two permanent magnets 20 and 21 are located on the longitudinal edges of the metal mesh tape 19 so that they can be fitted around the sheaf of cables like a sheath, the two permanent magnets 20 and 21 then being located above one another so as to close the sheath along one of its genetrices.

In the example of embodiment in the FIG. 1, a flexible strip is provided which includes a magnetic means which consists of a flexible material, such as rubber or plastic material, in which are dispersed the particles that conduct electricity. In that case, the magnetic means consists of a strip, if necessary flexible, of a permanent magnet. It is however possible, according to the invention, to make this permanent magnet by incorporating a magnetic powder in the insulating material already containing the conducting particles.

Figure 6:
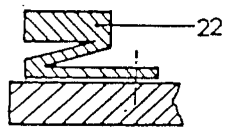
FIG. 6 shows a joint according to the invention, consisting of a single material combining the properties of conductivity and magnetism.

Thus FIG. 6 shows a joint 22 made with the aid of the flexible, conducting and magnetised material, this joint, having, for example, the general form of a "Z" and being fixed by some conductor means to its support.

Figure 7:
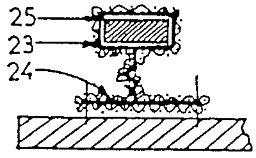
FIG. 7 shows another mode of embodiment of this joint.

Likewise, instead of using a metal braid as an external conducting envelope, as in the case of FIGS. 3 and 4, it is possible to cover the magnetised strip with a varnish or a paint that conducts electricity. Thus in FIG. 7, there is shown, by way of example, a joint consisting of a flexible, profiled section 23, in the general form of a "T", provided with a socket 24 for securing it, this profiled section containing the magnetic means, magnetised bar, magnetised powder, etc... and being covered with a flexible conducting film 25 made, for example, by coating.

The present invention thus enables a shielding joint to be made simply and inexpensively which, without requiring a strong mechanical pressure to be exerted, provides an efficient means of shielding an electric or electro-magnetic chamber against radio atmospherics. It will be noted, however, that instead of their being only a single joint between two metal surfaces that are to be connected electrically, it is possible to have two joints, located opposite one another, and each being fixed on one of the surfaces to be joined.

Of course, the invention is not limited to the examples of its embodiment herein above described and illustrated. If necessary, other modes and forms of embodiment can be used without departing from the scope of the invention.

What I claim is:

1. A shielding gasket for use in an earthing joint for shielding chambers electrically and electromagnetically, comprising:

a flexible strip;

a magnetized material in the form of a first strip embedded close to one edge of said flexible strip; and, an electrically conducting envelope of a metal mesh enclosing said flexible strip and its first strip of embedded magnetized material.

2. A shielding gasket for use in an earthing joint as in claim 1 wherein said flexible strip is made of a flexible cellular material.

3. A shielding gasket for use in an earthing joint as in claim 1 wherein a second magnetized strip of a stronger magnetized force than said first strip is embedded close to another edge of said flexible strip.

4. A shielding gasket for use in an earthing joint as in claim 1 wherein said metal mesh is knit from metal thread.

* * * * *

UNITED STATES PATENT OFFICE
CERTIFICATE OF CORRECTION

PATENT NO. : 3,889,043
DATED : June 10, 1975
INVENTOR(S) : Emile Paul Jules Jean Ducros It is certified that error appears in the above-identified patent and that said Letters Patent are hereby corrected as shown below:

In the heading, beneath UNITED STATES PATENT, first name of the inventor should read -- Emile --.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*